United States Patent [19]
Cox

[11] Patent Number: 6,056,798
[45] Date of Patent: May 2, 2000

[54] MULTI STAGE SEPARATOR

[75] Inventor: Donald G. Cox, Bargersville, Ind.

[73] Assignee: Air Equipment & Engineering, Inc., Martinsville, Ind.

[21] Appl. No.: 09/072,520

[22] Filed: May 4, 1998

[51] Int. Cl.⁷ .................................................. B01D 45/04
[52] U.S. Cl. ............................... 55/319; 55/392; 55/396; 55/439; 55/448
[58] Field of Search ........................... 55/318, 319, 383, 55/392, 394–396, 439, 441, 448; 96/189–192, 197, 198, 209, 215

[56] References Cited

U.S. PATENT DOCUMENTS

| | | | |
|---|---|---|---|
| 502,071 | 7/1893 | Gale | 55/392 |
| 1,735,298 | 11/1929 | Pfeffer | 55/396 X |
| 1,767,317 | 6/1930 | Shaughnessy | 55/396 X |
| 1,917,643 | 7/1933 | Goldkamp | 55/396 |
| 2,193,883 | 3/1940 | Reeves | 55/396 X |
| 2,540,695 | 2/1951 | Smith et al. | |
| 2,594,805 | 4/1952 | Rommel | 55/395 X |
| 3,258,895 | 7/1966 | Wiebe et al. | 55/396 X |
| 3,279,155 | 10/1966 | Lambert | 55/394 X |
| 3,362,155 | 1/1968 | Driscoll | 55/392 X |
| 3,368,330 | 2/1968 | Elliott et al. | 96/215 X |
| 3,486,309 | 12/1969 | Wild | 55/319 X |
| 3,725,271 | 4/1973 | Giannotti | |
| 3,884,660 | 5/1975 | Perry, Jr. et al. | 55/396 |
| 4,180,391 | 12/1979 | Perry, Jr. et al. | 55/396 X |
| 4,187,089 | 2/1980 | Hodgson | 55/396 X |
| 4,764,191 | 8/1988 | Morelli | |
| 4,769,050 | 9/1988 | Shaw et al. | 55/319 X |
| 4,874,409 | 10/1989 | Vitovec et al. | |
| 5,480,465 | 1/1996 | Cox | |
| 5,549,721 | 8/1996 | Shchipachev | 55/394 X |

FOREIGN PATENT DOCUMENTS

| | | | |
|---|---|---|---|
| 1063400 | 5/1954 | France | 55/396 |

*Primary Examiner*—Robert H. Spitzer
*Attorney, Agent, or Firm*—Woodard, Emhardt, Naughton, Moriarty & McNett Patent and Trademark Attorneys

[57] ABSTRACT

A multi stage separator for separating fluid and material. The conduit has a series of tubes arranged to convey material in a fluid stream with the last tube emptying into a receptacle. Each tube is separated from the prior tube forming exhaust vents whereat at least some of the fluid from the stream is exhausted. The downstream tube at each vent has a smaller cross-sectional area as compared to the adjacent upstream tube with a cone shaped vane extending outwardly to direct the exhausting fluid. The heavier than fluid material is provided with sufficient kinetic energy by the reduced size tubes to allow the fluid to exhaust while the material flows along the longitudinal axis of the tubes.

4 Claims, 2 Drawing Sheets

MULTI STAGE SEPARATOR

BACKGROUND OF THE INVENTION

1. Field of the Invention

This invention is in the field of devices for conveying a variety of material in an air stream and then separating the material from the stream.

2. Description of the Prior Art

In my U.S. Pat. No. 5,480,465, I disclose a device for separating material carried by an air stream. The air and material flow through a conduit with a portion of the air being extracted from the conduit in a sideways direction prior to the material exiting the conduit into a receptacle. Depending upon the type of material to be conveyed and the size of the conduit, it is possible in many cases for the foreign material to adhere to the inside surface of the conduit particularly at the location where a portion of the air is being extracted. I disclose in my patent a screen or filter for minimizing the material from building up or sticking to the inside surface of the separator. Disclosed herein is another technique wherein the conduit has a reduced internal cross sectional area immediately after the location where at least a portion of the air from the stream is extracted. Thus, the kinetic energy of the material is sufficient to ensure the flow of the material from the conduit into the receptacle.

Additional devices have been devised for separating particles from a variety of liquids and gases. For example see U.S. Pat. No. 2,540,695 issued to Smith et al., U.S. Pat. No. 3,725,271 issued to Giannotti. U.S. Pat. No. 4,764,191 issued to Morelli. and U.S. Pat. No. 4,874,409 issued to Vitovec et al.

SUMMARY OF THE INVENTION

One embodiment of the present invention is a multi stage separator for separating material from a fluid stream comprising a conduit including an inlet for collecting and receiving material and a material outlet through which the material exits the conduit. The conduit includes a primary fluid outlet located between the inlet and the material outlet. The conduit further includes a first internal cross sectional area located between the inlet and the primary fluid outlet and a second internal cross sectional area located between the primary fluid outlet and the material outlet. The second internal cross sectional area is sized smaller than the first internal cross sectional area to maintain forward movement of material in the conduit. At least some of the fluid is exhausted at the primary fluid outlet. A receptacle is connected to the material outlet. A pressure means pulls the fluid and the material into the inlet, some of the fluid out the primary fluid outlet, and the material through the conduit and into the receptacle.

It is an object of the present invention to provide a new and improved device for separating material conveyed in an air stream.

A further object of the present invention is to provide a multi stage separator for separating material from a fluid stream.

Yet a further object of the present invention is to provide a compact material/air separator which will extract air from an air stream while providing sufficient kinetic energy to the material limiting adherence of the material within the separator.

Related object and advantages of the present invention will be apparent from the following description.

DESCRIPTION OF THE PREFERRED EMBODIMENT

Figure 1:
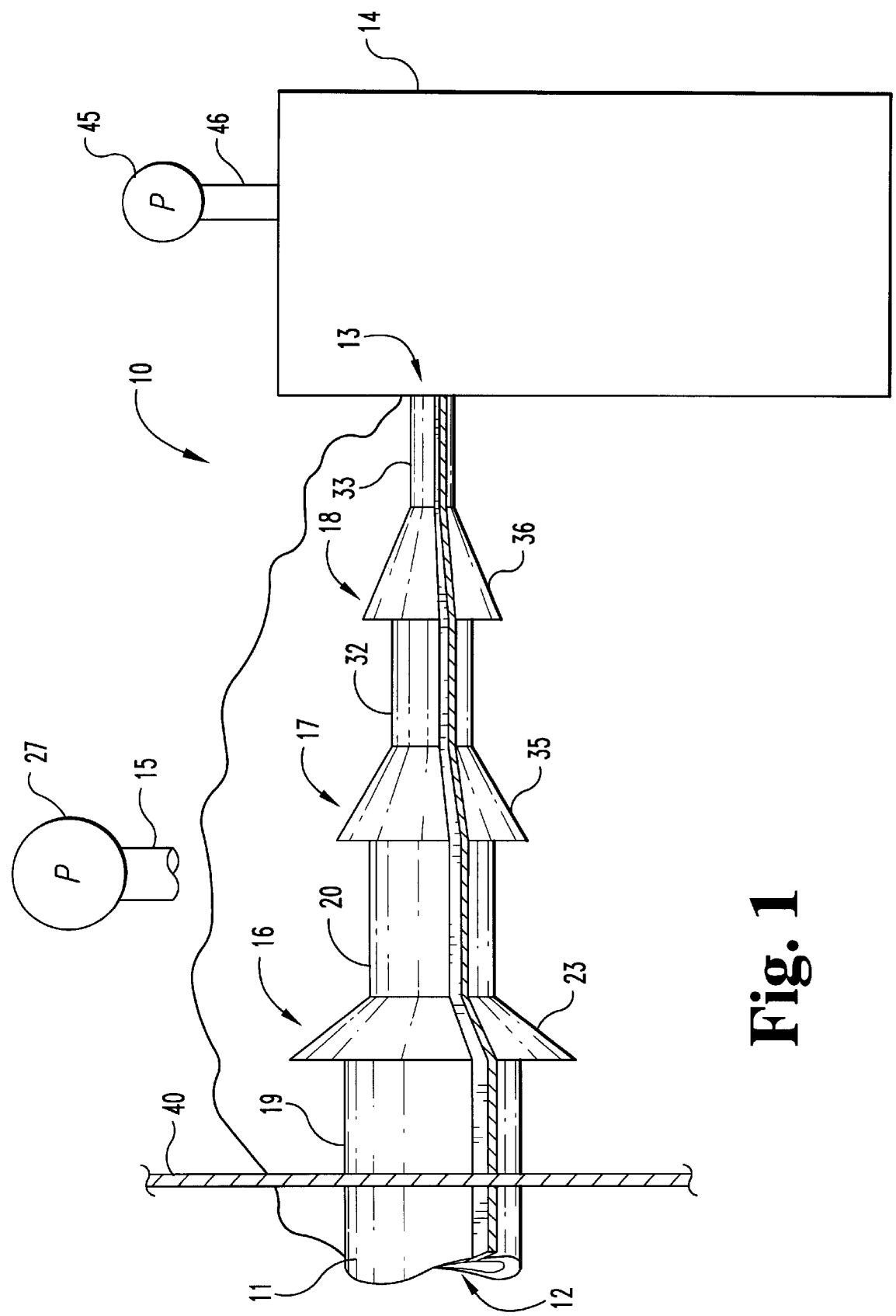
FIG. 1 is a fragmentary side view of multi stage separator incorporating my new invention.

For the purposes of promoting an understanding of the principles of the invention. reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the preferred embodiment of a multi stage separator 10 for separating material from a fluid stream. The separator includes a main conduit 11 having an inlet 12 for collecting and receiving material along with fluid, such as air. The outlet 13 of the conduit empties into a receptacle 14 whereas the majority of the fluid or air within conduit 11 exits the conduit via a primary exhaust outlet connected to conduit 15. The material introduced into the conduit via inlet 12 may include small particles, such as dust, and other particles generated during a manufacturing process. Likewise, the material conveyed may be larger objects such as small pieces of waste paper, cardboard, or even finished product including candies or other manufactured product.

Conduit 11 includes either a single primary fluid outlet or a plurality of primary fluid outlets located between the inlet 12 and outlet 13. In the embodiment shown in the drawings, the separator includes three primary fluid outlets 16, 17, and 18 although it is to be understood the invention contemplates fewer than or more than three primary fluid outlets.

Figure 3:
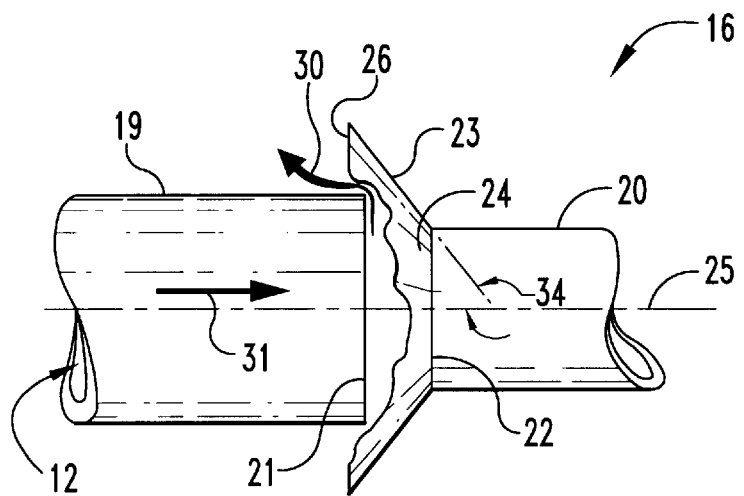
FIG. 3 is a fragmentary view of one stage of the separator.

Outlet 16 will now be described it being understood that a similar description applies to outlets 17 and 18. Outlet 16 (FIG. 3) consists of a pair of separate tubes 19 and 20 which together form conduit 11 along with the tubes of the remaining fluid outlets. Tube 19 includes the inlet 12 and has a distal end 21 spaced apart from the adjacent end 22 of tube 20. A cone shaped vane 23 has a proximal end 24 fixedly attached to end 22 of tube 20 and surrounds the longitudinal axis 25 extending through conduit 11 from inlet 12 to outlet 13. Likewise, vane 23 is spaced apart from tube 19 with the distal end 21 of tube 19 being located between ends 26 and 24 of the cone shaped vane 23.

Tube 20 has an internal cross-sectional area smaller than the internal cross-sectional area of tube 19. In the particular embodiment shown in the drawings, both tubes 19 and 20 are circular although the invention contemplates and includes a variety of internal tube geometry. Thus, the internal cross-sectional area of tube 20 has a smaller inside diameter than tube 19 and thus, is provided with a smaller cross-sectional area as compared to the larger tube 19.

Figure 2:
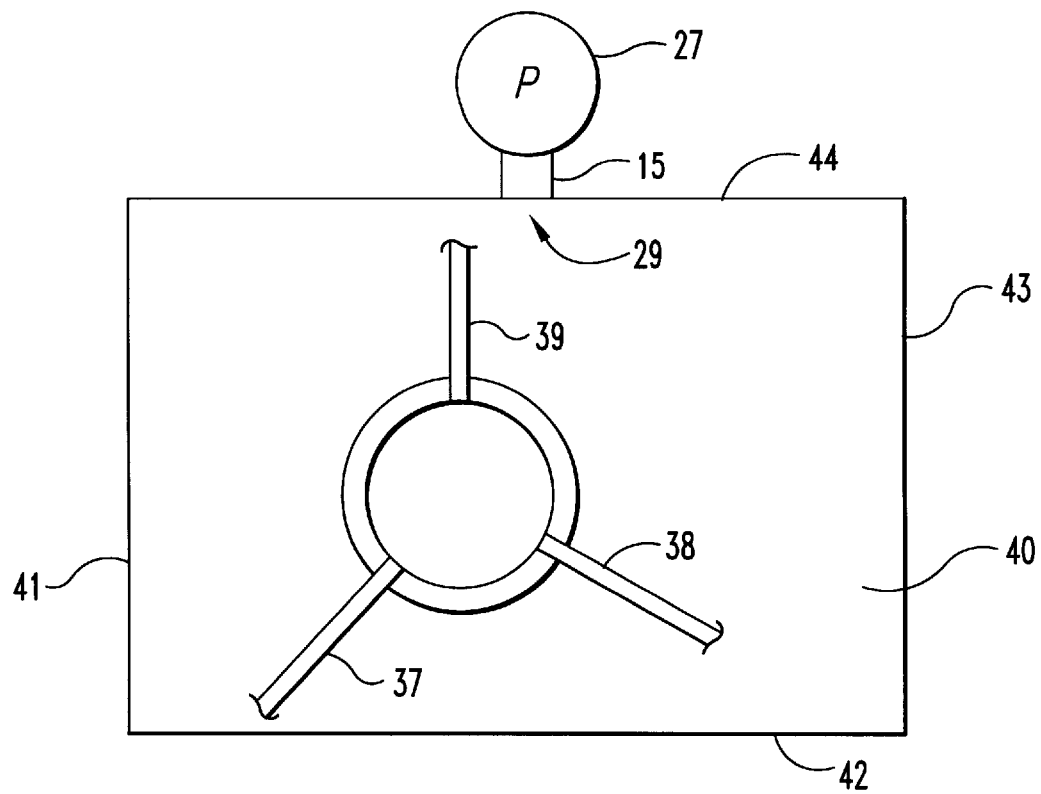
FIG. 2 is a left end view.

The fluid or air flowing through tube 19 carries with it the material collected and introduced into inlet 12. Pressure means, such as a pump 27 (FIG. 2) is connected via conduit 15 to exhaust port 29 causing the majority of air exiting end 21 of tube 19 to flow in the direction of arrow 30 and out via exhaust outlet 29. The heavier than air particles being conveyed through tube 19 allows the particles to move into vane 23 in the downstream direction of arrow 31. The cone shaped or funnel shaped vane 23 extends outwardly from axis 25 and along axis 25 in an upstream direction opposite of arrow 31. Thus, the particles exiting end 21 are caused by the converging shape of vane 23 to flow into a smaller sized tube 20 as compared to tube 19 increasing the velocity of the particles and ensuring sufficient momentum and kinetic energy of the particles forcing the particles down stream through tube 20 while the majority of fluid or air exits in the direction of arrow 30. This process is repeated in stages 17 and 18 so that eventually the particles being conveyed empty into receptacle 14 whereas the majority of the fluid or air within the stream flowing through conduit 11 is exhausted via pump 27. Thus, tube 32 (FIG. 1) of stage 17 has a smaller internal cross-sectional area as compared to tube 20 whereas tube 33 has a smaller internal cross-sectional area as compared to tube 32. In one embodiment, the inside diameter of tube 19 is six inches, the inside diameter of tube 20 is four inches, the inside diameter of tube 32 is two inches whereas the inside diameter of tube 33 is three-quarter inches. In the same embodiment, vane 23 is arranged at angle 34 (FIG. 3) relative to longitudinal axis 25 in the amount of 30°. Likewise, vane 35 is arranged at an angle relative to the longitudinal axis in the amount of 25° and vane 36 is arranged at an angle relative to the longitudinal axis in the amount of 20°. In other words, not only do the inside diameters of the tubes decrease with each respective downstream stage but also the angle of the vane relative to the longitudinal axis for each particular stage decreases with each respective downstream stage.

Tubes 19, 20, 32 and 33 along with the associated vanes are secured to a plurality of walls extending in the direction of the longitudinal axis 25. In the embodiment shown in the drawings, three walls 37, 38, and 39 (FIG. 2) are arranged at 120° intervals around the longitudinal axis 25 with walls 37–39 being fixed to the tubes and vanes for stability and mounting purposes. Walls 37–39 are, in turn, secured to a plurality of vertical walls 40 (FIG. 1), in turn, mounted to walls 41–44. Sufficient clearance is provided between walls 37–39 relative to walls 40–44 to allow the air exhausted via outlet 16–18 to flow outwardly through outlet 29 and into conduit 15 under the pressure exerted by pump 27. A secondary pump 45 (FIG. 1) is connected via exhaust conduit 46 to a secondary air exhaust vent provided in receptacle 14 to exhaust the remaining excess air or fluid within the receptacle. Alternatively, conduits 15 and 46 may be connected to a single pump in lieu of pumps 27 and 45. Typically, 80 percent of the fluid or air introduced into outlet 12 is exhausted via conduit 15 whereas the remaining 20 percent of fluid is exhausted via conduit 46. In the same preferred embodiment, the inlet velocity at inlet 12 is approximately 4000 ft/minute whereas the velocity within tube 15 is 6000 ft/minute and the velocity at outlet 13 is 3000 ft/minute.

All three stages 16–18 are located between the inlet and outlet 13 with the internal cross-sectional area of each tube being sized smaller than the preceding tube internal cross-sectional area to maintain the forward movement of the material in the conduit although at least some of the fluid is exhausted at each stage.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A multi stage separator for separating material from a fluid stream comprising:
    a conduit including an inlet for collecting and receiving material and a material outlet through which said material exists said conduit, said conduit including a first primary fluid outlet located between said inlet and said material outlet, said conduit further including a first internal cross sectional area located between said inlet and said primary fluid outlet and a second internal cross sectional area located between said primary fluid outlet and said material outlet with said second internal cross sectional area sized smaller than said first internal cross sectional area to maintain forward movement of material in said conduit although at least some of said fluid is exhausted at said primary fluid outlet;
    a receptacle connected to said material outlet receiving said material; and,
    pressure means to pull fluid and said material into said inlet, some of said fluid out said primary fluid outlet and said material through said conduit and into said receptacle; wherein:
        said conduit includes a second primary fluid outlet located between said first primary fluid outlet and said material outlet, said conduit further includes a third internal cross sectional area located between said second primary fluid outlet and said material outlet with said third internal cross sectional area sized smaller than said second internal cross sectional area to maintain forward movement of material in said conduit although at least some of said fluid is exhausted at said second primary fluid outlet,
        said conduit includes a third primary fluid outlet located between said second primary fluid outlet and said material outlet, said conduit further includes a fourth internal cross sectional area located between said third primary fluid outlet and said material outlet with said fourth internal cross sectional area sized smaller than said third internal cross sectional area to maintain forward movement of material in said conduit although at least some of said fluid is exhausted at said third primary fluid outlet,
        said conduit includes at said first primary fluid outlet, said second primary fluid outlet and said third primary fluid outlet separate funnel shaped walls extending outwardly therefrom and diverging outwardly in an upstream direction from said material outlet toward said inlet, said second internal cross sectional area remains constant from first primary fluid outlet to said second primary fluid outlet, said third internal cross sectional area remains constant from said second primary fluid outlet to said third primary fluid outlet, said fourth internal cross sectional area remains constant from said third primary fluid outlet to said material outlet.

2. The separator of claim 1 wherein:
    said conduit includes a longitudinal axis and said separate funnel shaped walls extend outwardly along said longitudinal axis past said first primary fluid outlet, said second primary fluid outlet and said third primary fluid outlet.

3. The separator of claim 2 wherein:
    said pressure means includes a first fluid pump connected to said first primary fluid outlet, said second primary fluid outlet and said third primary fluid outlet to exhaust fluid therefrom and further includes a second fluid pump connected to said receptacle to force fluid and said material via said inlet into said conduit.

4. The separator of claim 3 further comprising:
    each of said funnel shaped walls are arranged relative to said longitudinal axis at a smaller angle than the preceding funnel shaped wall.

* * * * *